P. DICKINSON.
Corn Sheller.
No. 10,003. Patented Sept. 6, 1853.
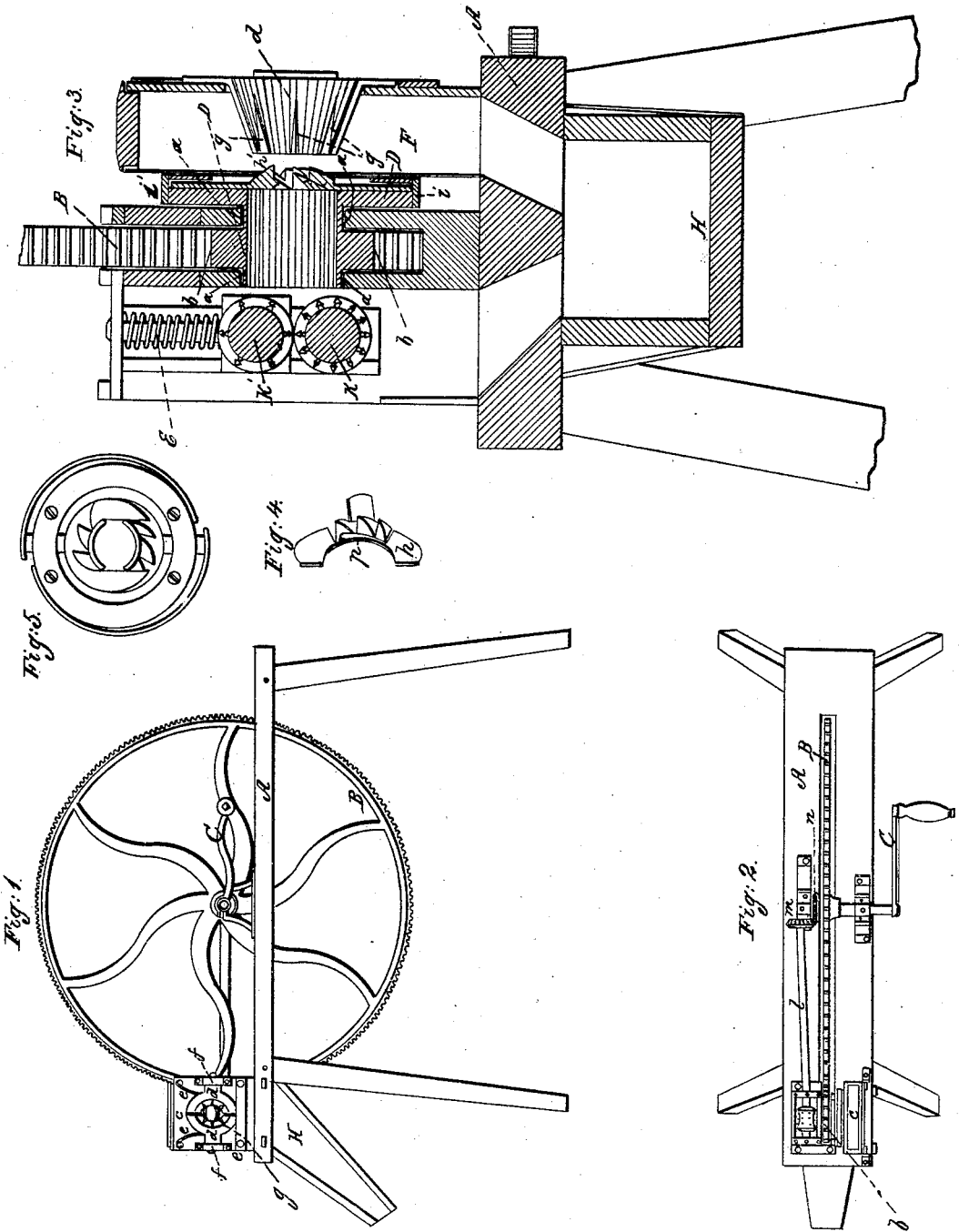

UNITED STATES PATENT OFFICE.

PORTER DICKINSON, OF AMHERST, MASSACHUSETTS.

IMPROVEMENT IN CORN-SHELLERS.

Specification forming part of Letters Patent No. 10,003, dated September 6, 1853.

*To all whom it may concern:*

Be it known that I, PORTER DICKINSON, of Amherst, in the county of Hampshire and State of Massachusetts, have invented a new and useful Improvement in Corn-Shellers; and I hereby declare the following to be a full, clear, and exact description of the same, reference being had to the annexed drawings, making part of this specification.

My invention is applicable to corn-shellers similar to that patented by J. W. Gordon, October 7, 1846, and is designed to remedy the defects existing in that class of corn-shellers as heretofore constructed, in which it was necessary to force through each cob by hand, the screw-thread upon the revolving shellers not being sufficient for the purpose; and my improvement consists in the addition to machines of this description of a pair of toothed rollers, which seize the cob after the corn is shelled from it and drag it entirely through the machine.

In order to enable others to make and use my invention, I will proceed to describe its construction and operation.

Figure 1 is an elevation of the machine; Fig. 2, a plan; Fig. 3, a transverse section through the operating parts. Fig. 4 is a view of one of the toothed shellers detached. Fig. 5 is a front view of the hollow tube D with the toothed shellers in place.

A is the frame-work of the machine.

B is a cogged wheel driven by the crank C, by which motion is communicated to the operating parts.

D is a hollow tube of the form represented in section in Fig. 3, and which is permitted to revolve in bearings $a$, rising from the frame. Upon the exterior surface of this cylinder or tube is a cogged gear, $b$, (seen in Fig. 2,) and which engages with and is caused to revolve by the driving-gear B.

$c$ is a box attached to the upper part of the machine, and carrying the principal operating parts.

$d$ are two semi-guides which, when brought together in the position seen in Fig. 1, form a conical opening through which the cob is passed to the revolving shellers. These guides $d$ are pressed up to their work by springs $e$, and are guided in their motion and kept in place by the straps $f$, under which they pass. A slight motion out and in is thus allowed to the guides, by which means the conical opening adapts itself to the size of the ear of corn to be shelled, the projections $g$ holding the ear and preventing it from being turned. Immediately in the rear of this guide, and adapted to the face of the revolving tube D, are two toothed shellers, $h\ h'$, which, when the machine is not in use, approach very near to each other, as represented in Fig. 1, but are forced apart by the cob when in operation, as seen in Fig. 5, and are pressed together by the action of the springs $i\ i'$, which permit them to recede from each other an amount proportionate to the size of the cob.

$k\ k'$ are two toothed rollers, placed immediately behind the revolving tube D. The lower one of these rollers is secured to the shaft $l$, having a gear, $m$, at one end, which engages with a gear, $n$, upon the shaft of the driving-wheel B, by which means the lower roller is made to revolve. The upper roller is pressed down to its work by springs E, which permit it to rise and fall, according to the size of the cob to be drawn through.

Operation: Motion being given to the crank by the right hand, the ear is pressed into the conical opening between the guides $d$, which are permitted to recede from each other by the yielding of the springs $e$. The cob is then made to enter between the revolving toothed shellers $h\ h'$, the teeth of which tear the grain from the cob. These shellers are furnished each with a portion of a thread of a screw, $p$, which aids in drawing in the cob. As the latter is pressed through, it is seized by the toothed rollers $k\ k'$, which carry it entirely through the machine. The left hand of the operator is then at liberty to take another ear, which is pressed in between the revolving shellers, as before, and the operation continues.

In machines of this character as heretofore constructed, it became necessary to force the cob entirely through by hand, the operation of the screw-thread $p$ being slow and uncertain. As at present improved, however, it works rapidly and perfectly, the spring-shellers $h\ h'$ stripping off every kernel from the cob, whether the latter be large or small, while the toothed rollers $k\ k'$ draw the naked cobs through with great rapidity. The grain passing down the passage F into the trough H is received into a proper receptacle.

Having thus described my invention, what I claim as new, and desire to secure by Letters Patent, is—

The combination of the revolving spring-shellers $h\ h'$ with the toothed rollers $k\ k'$, operating in manner substantially as described.

In testimony whereof I have hereunto set my signature this 28th day of March, A. D. 1853.

PORTER DICKINSON.

Witnesses:
    EDWARD DICKINSON,
    E. G. BOWDOIN.